(12) United States Patent
Hatch et al.

(10) Patent No.: US 12,149,141 B2
(45) Date of Patent: Nov. 19, 2024

(54) SYSTEM FOR AN ELECTRICAL MOTOR WITH COIL ASSEMBLIES AND EXTERNAL RADIAL MAGNETIC ELEMENTS

(71) Applicant: Linear Labs, LLC, Granbury, TX (US)

(72) Inventors: Erik Christopher Hatch, Granbury, TX (US); Anto Joseph Barigala Charles Paulraj, Granbury, TX (US); Abla Hariri, Granbury, TX (US)

(73) Assignee: Linear Labs, Inc., Granbury, TX (US)

( * ) Notice: Subject to any disclaimer, the term of this patent is extended or adjusted under 35 U.S.C. 154(b) by 49 days.

(21) Appl. No.: 18/086,508

(22) Filed: Dec. 21, 2022

(65) Prior Publication Data

US 2023/0131107 A1 Apr. 27, 2023

Related U.S. Application Data

(63) Continuation-in-part of application No. 17/979,615, filed on Nov. 2, 2022, now Pat. No. 11,784,529, and
(Continued)

(51) Int. Cl.
*H02K 21/12* (2006.01)
*H02K 1/27* (2022.01)
(Continued)

(52) U.S. Cl.
CPC .................. *H02K 3/47* (2013.01); *H02K 1/27* (2013.01); *H02K 3/522* (2013.01); *H02K 11/30* (2016.01);
(Continued)

(58) Field of Classification Search
CPC ........... H02K 1/18; H02K 1/02; H02K 1/146; H02K 15/0062; H02K 1/27; H02K 11/30;
(Continued)

(56) References Cited

U.S. PATENT DOCUMENTS 4,104,548 A 8/1978 Borello
4,214,178 A 7/1980 Tippner
(Continued)

OTHER PUBLICATIONS

International Search Report and Written Opinion for International Patent Application No. PCT/US2022/32020 dated Sep. 13, 2022.
(Continued)

*Primary Examiner* — Leda T Pham
(74) *Attorney, Agent, or Firm* — Run8 Patent Group, LLC; Peter Miller; Alexander Rodriguez

(57) ABSTRACT

One variation of a system for an electric motor includes a set of coil assemblies defining: an inner radial facet, an outer radial facet, a first axial facet, and a second axial facet opposite the first axial facet. Additionally, each coil assembly in the set of coil assemblies includes a receiving member arranged at the outer radial facet of the coil assembly. Furthermore, the system includes a rotor comprising a set of magnetic elements: encompassing the inner radial facet, the outer radial facet, the first axial facet, and the second axial facet of the set of coil assemblies; and defining a radial magnetic tunnel. The system also includes a housing: engaging the receiving member of each coil assembly, in the set of coil assemblies to couple the housing to the set of coil assemblies; and includes a shaft coupled to the set of magnetic elements.

20 Claims, 10 Drawing Sheets

Related U.S. Application Data a continuation-in-part of application No. 17/831,337, filed on Jun. 2, 2022, now Pat. No. 11,588,366, said application No. 17/979,615 is a continuation of application No. 17/003,855, filed on Aug. 26, 2020, now Pat. No. 11,532,963.

(60) Provisional application No. 63/252,868, filed on Oct. 6, 2021, provisional application No. 63/195,764, filed on Jun. 2, 2021, provisional application No. 62/989,653, filed on Mar. 14, 2020, provisional application No. 62/958,213, filed on Jan. 7, 2020, provisional application No. 62/942,736, filed on Dec. 2, 2019, provisional application No. 62/902,961, filed on Sep. 19, 2019, provisional application No. 62/895,498, filed on Sep. 4, 2019, provisional application No. 62/895,481, filed on Sep. 3, 2019, provisional application No. 62/891,949, filed on Aug. 26, 2019.

(51) Int. Cl.
| | |
|---|---|
| *H02K 3/47* | (2006.01) |
| *H02K 3/52* | (2006.01) |
| *H02K 11/30* | (2016.01) |
| *H02K 15/00* | (2006.01) |
| *H02K 15/095* | (2006.01) |
| *H02K 16/02* | (2006.01) |
| *H02K 21/14* | (2006.01) |

(52) U.S. Cl.
CPC ....... *H02K 15/0062* (2013.01); *H02K 15/095* (2013.01); *H02K 16/02* (2013.01); *H02K 21/12* (2013.01); *H02K 21/145* (2013.01); *H02K 2201/12* (2013.01); *H02K 2203/12* (2013.01); *H02K 2211/03* (2013.01)

(58) Field of Classification Search
CPC .... H02K 21/12; H02K 21/145; H02K 15/095; H02K 3/522; H02K 11/33; H02K 16/02; H02K 3/47

See application file for complete search history.

(56) References Cited

U.S. PATENT DOCUMENTS

| | | |
|---|---|---|
| 4,381,181 A | 4/1983 | Clegg |
| 5,696,419 A | 12/1997 | Rakestraw et al. |
| 6,252,317 B1 | 6/2001 | Scheffer et al. |
| 6,891,306 B1 * | 5/2005 | Soghomonian .......... H02K 1/27 310/266 |
| 2007/0228860 A1 | 10/2007 | Rao |
| 2008/0278020 A1 * | 11/2008 | Ley ..................... H02K 21/222 310/156.01 |
| 2014/0246962 A1 | 9/2014 | Smith |
| 2015/0171694 A1 | 6/2015 | Walsh |
| 2016/0043602 A1 | 2/2016 | Hosek et al. |
| 2016/0380496 A1 | 12/2016 | Hunstable |
| 2017/0214281 A1 | 7/2017 | Seo et al. |
| 2018/0013336 A1 | 1/2018 | Li |
| 2021/0067016 A1 | 3/2021 | Hunstable et al. |

OTHER PUBLICATIONS

Non-Final Office Action for U.S. Appl. No. 17/003,855 dated Mar. 31, 2022.

Notice of Allowance and Fees Due for U.S. Appl. No. 17/8361,337 dated Oct. 19, 2022.

* cited by examiner

SYSTEM FOR AN ELECTRICAL MOTOR WITH COIL ASSEMBLIES AND EXTERNAL RADIAL MAGNETIC ELEMENTS

CROSS-REFERENCE TO RELATED APPLICATIONS

This Application is a continuation-in-part of U.S. Non-Provisional application Ser. No. 17/979,615, filed on 2 Nov. 2022, which is a continuation of U.S. Non-Provisional application Ser. No. 17/003,855, filed on 26 Aug. 2020, each of which is incorporated in its entirety by this reference.

U.S. Non-Provisional application Ser. No. 17/003,855 claims the priority and benefit of the filing date of the following U.S. Provisional Application Nos: 62/902,961, filed on 19 Sep. 2019; 62/942,736, filed on 2 Dec. 2019; 62/958,213, filed on 7 Jan. 2020; 62/989,653, filed on 14 Mar. 2020; 62/891,949, filed on 26 Aug. 2019; 62/895,481, filed on 3 Sep. 2019; and 62/895,498, filed on 4 Sep. 2019, each of which is incorporated in its entirety by this reference.

This Application is a continuation-in-part of U.S. Non-Provisional application Ser. No. 17/831,337, filed on 2 Jun. 2022, which claims the benefit of U.S. Provisional Application No. 63/195,764, filed on 2 Jun. 2021, and 63/252,868, filed on 6 Oct. 2021, each of which is incorporated in its entirety by this reference.

TECHNICAL FIELD

This invention relates generally to the field of electric motors and more specifically to a new and useful system for a stator located internally within a set of magnetic elements in the field of electric motors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
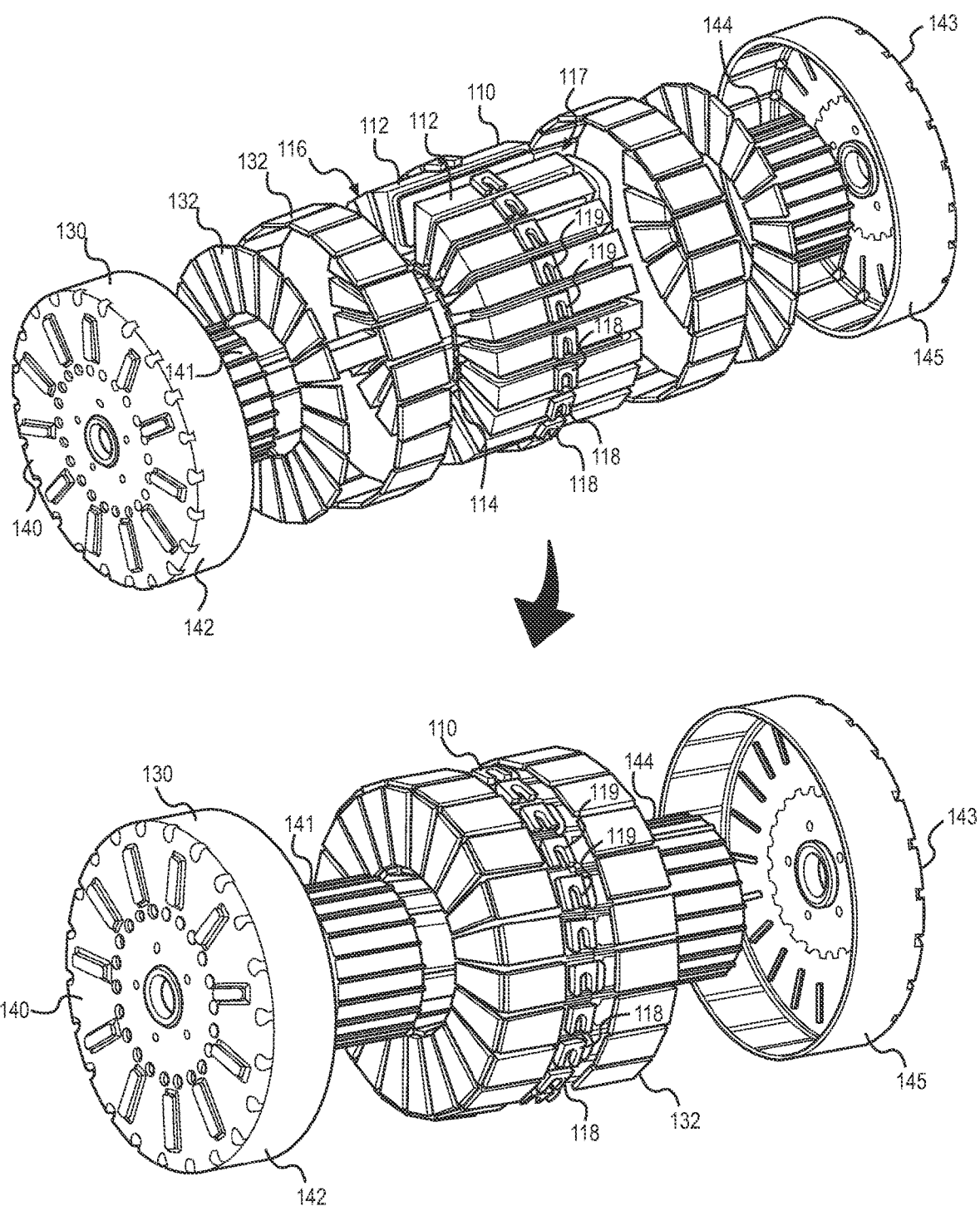
FIG. 1 is a schematic representation of the system.
Figure 2:
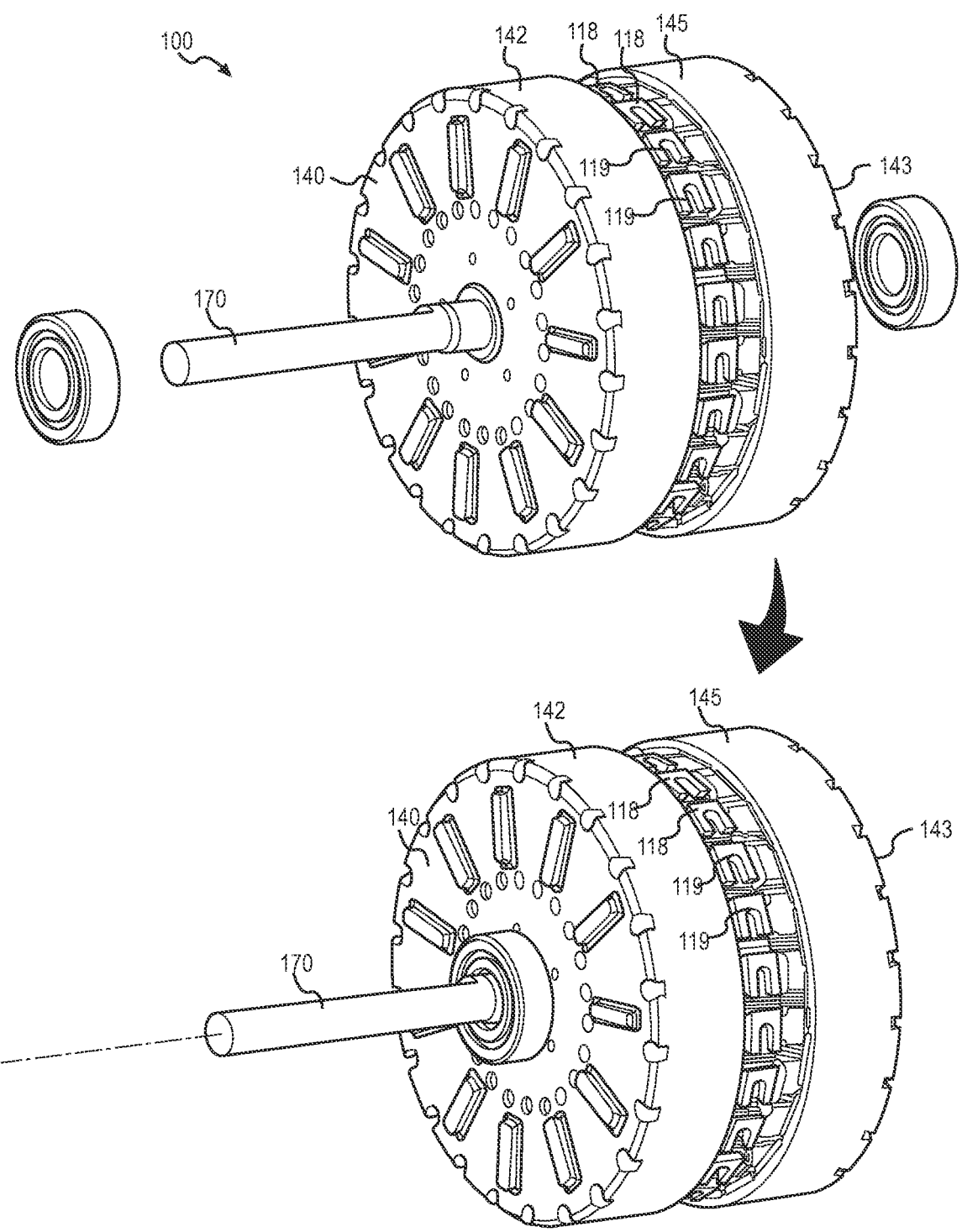
FIG. 2 is a schematic representation of the system.
Figure 3:
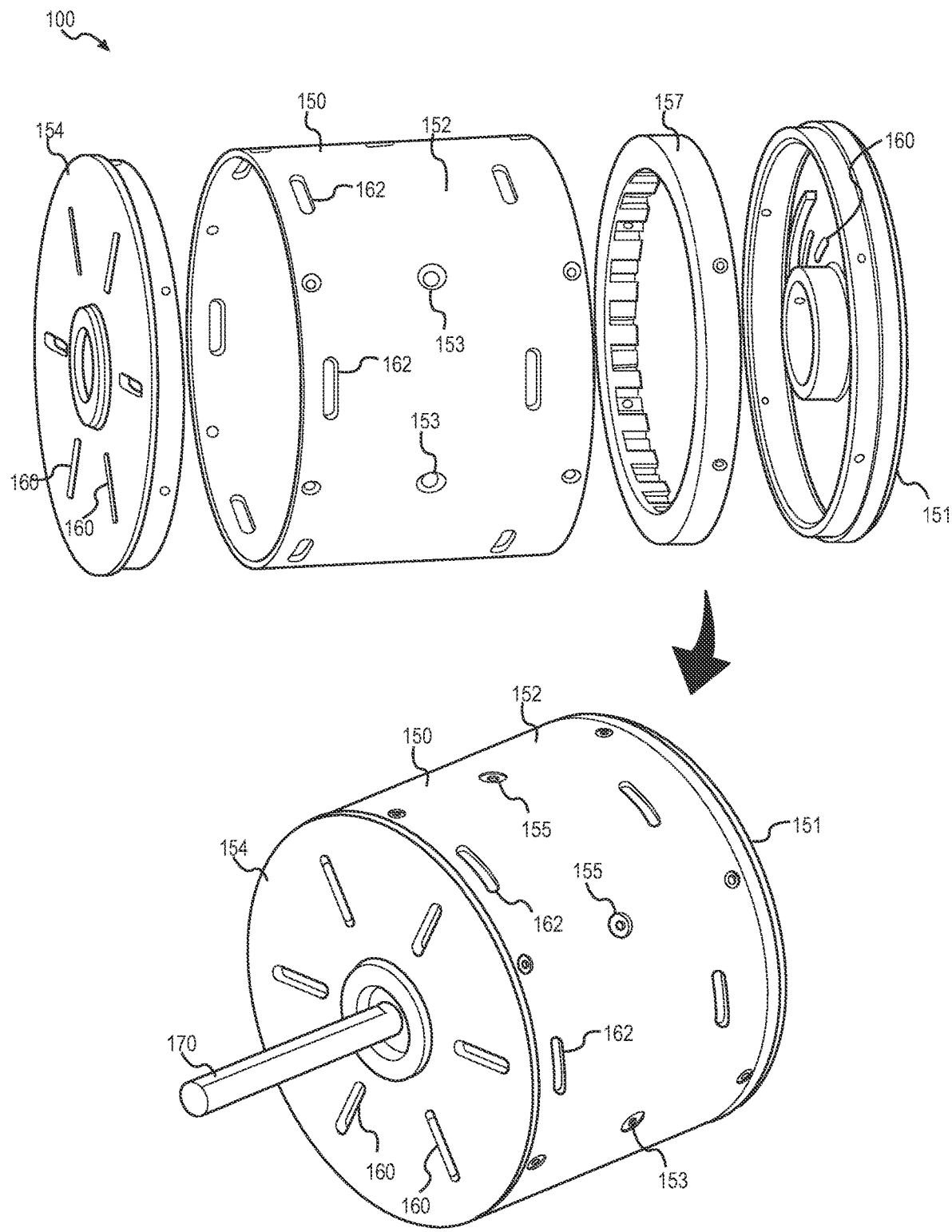
FIG. 3 is a schematic representation of the system.
Figure 4:
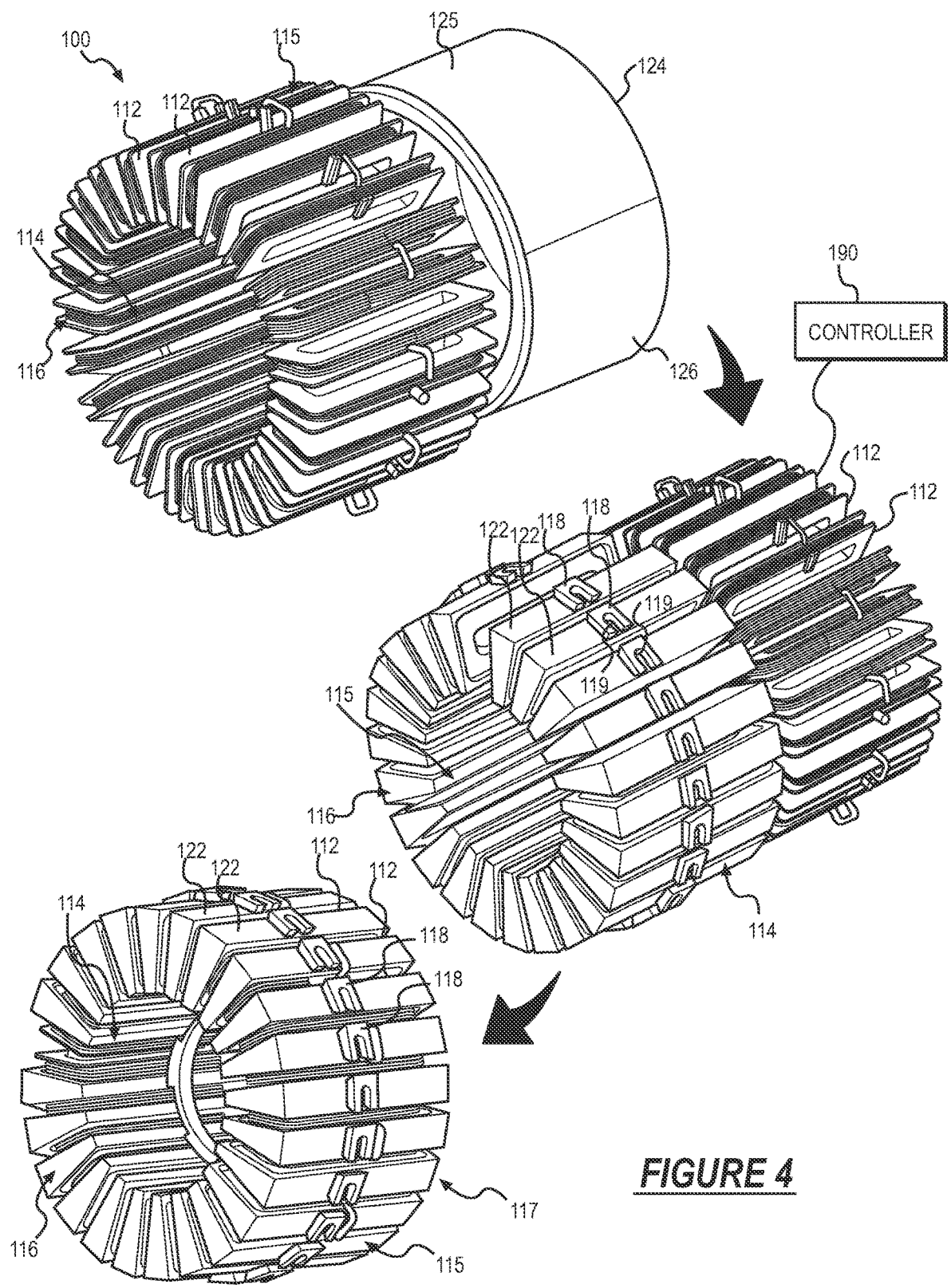
FIG. 4 is a schematic representation of the system.
Figure 5:
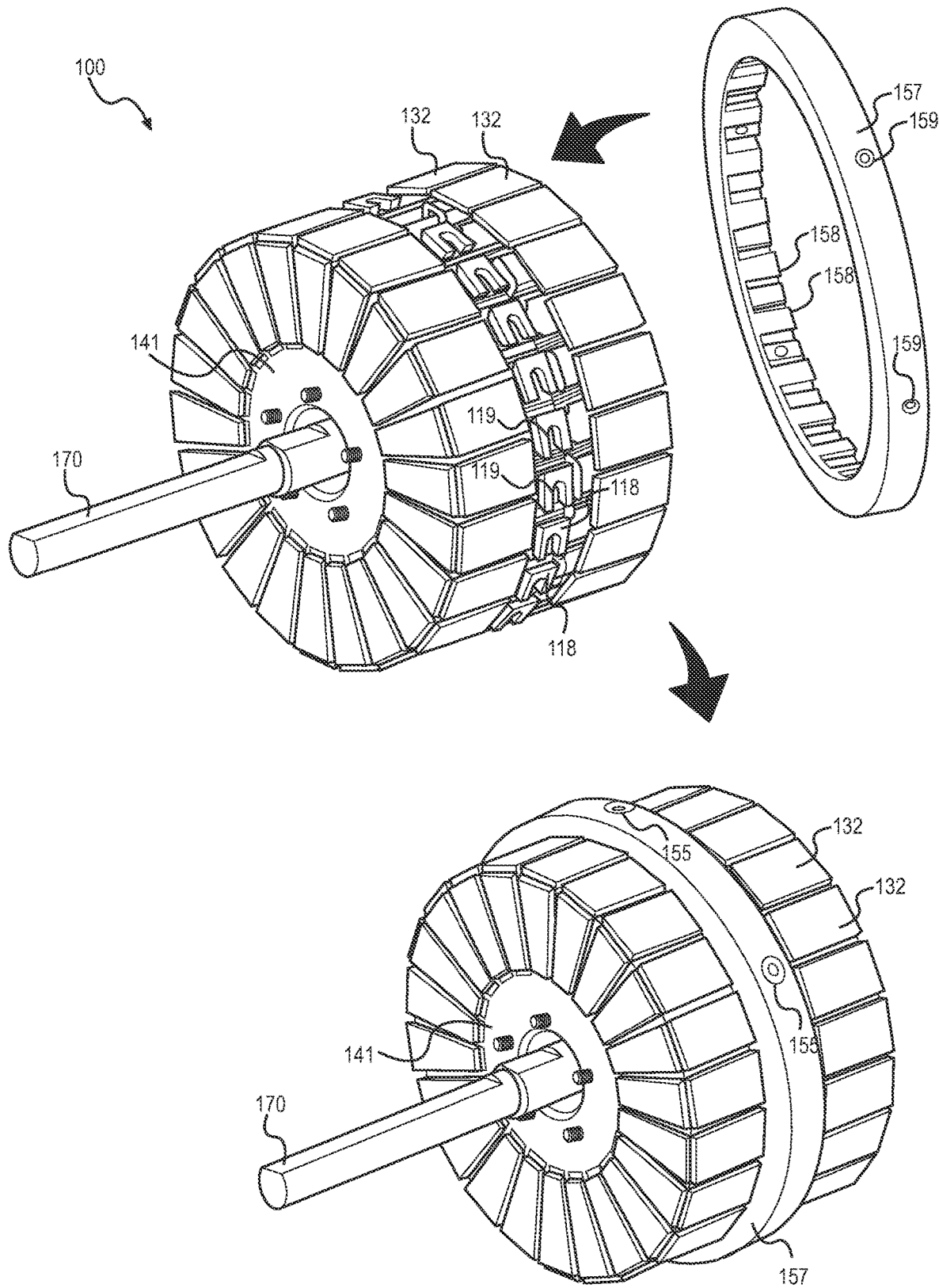
FIG. 5 is a schematic representation of the system.
Figure 6:
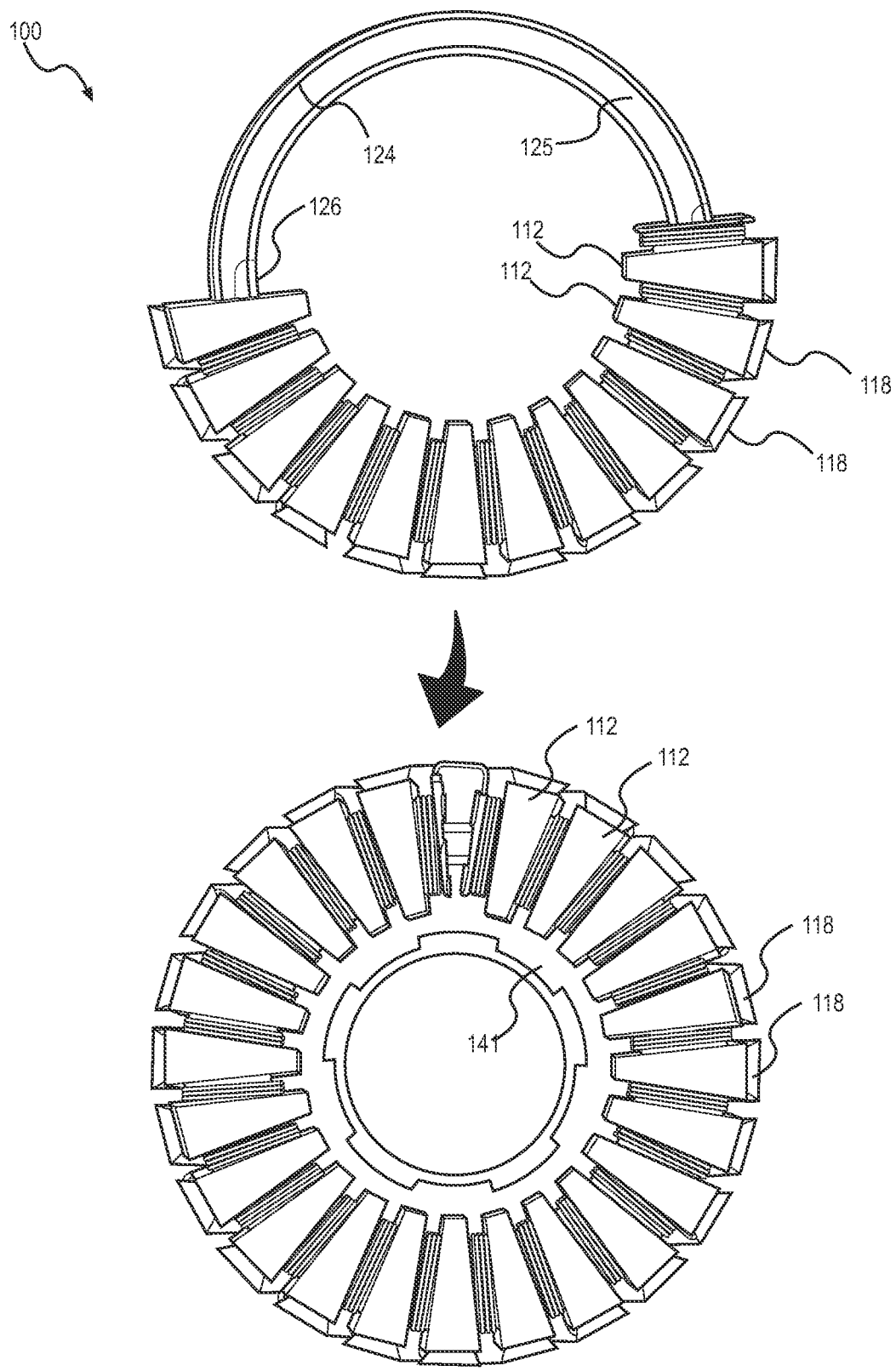
FIG. 6 is a schematic representation of the system.
Figure 7A:
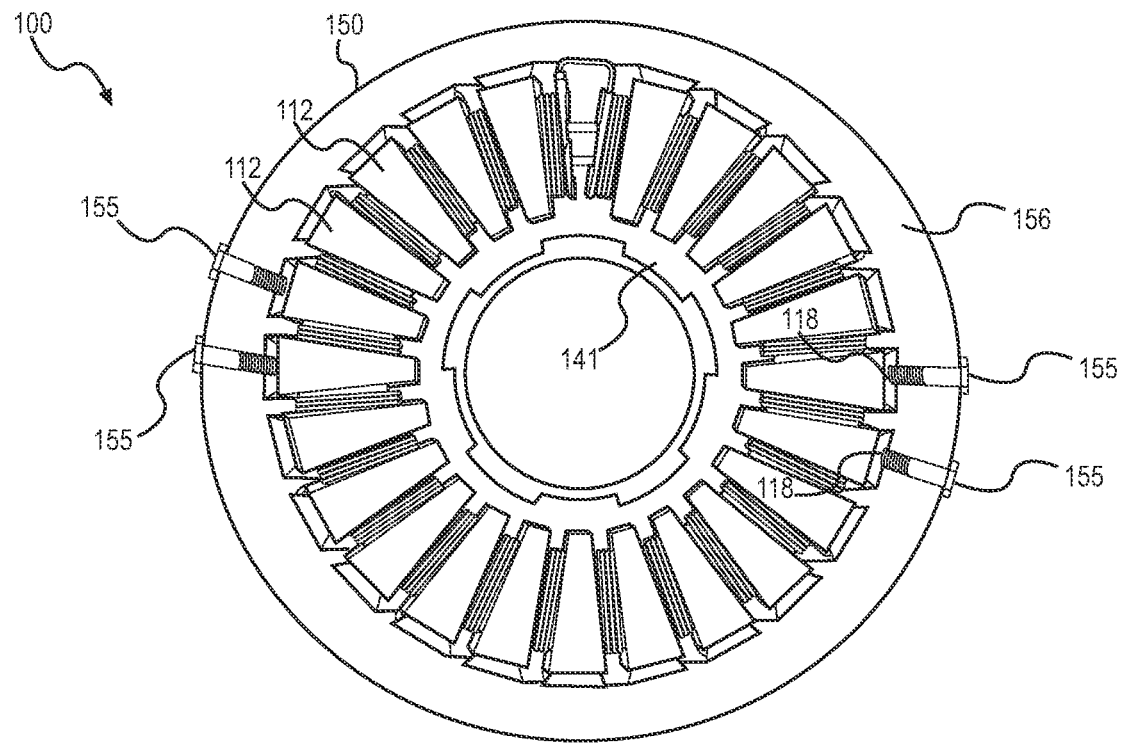
FIGS. 7A and 7B are a schematic representation of the system.
Figure 7B:
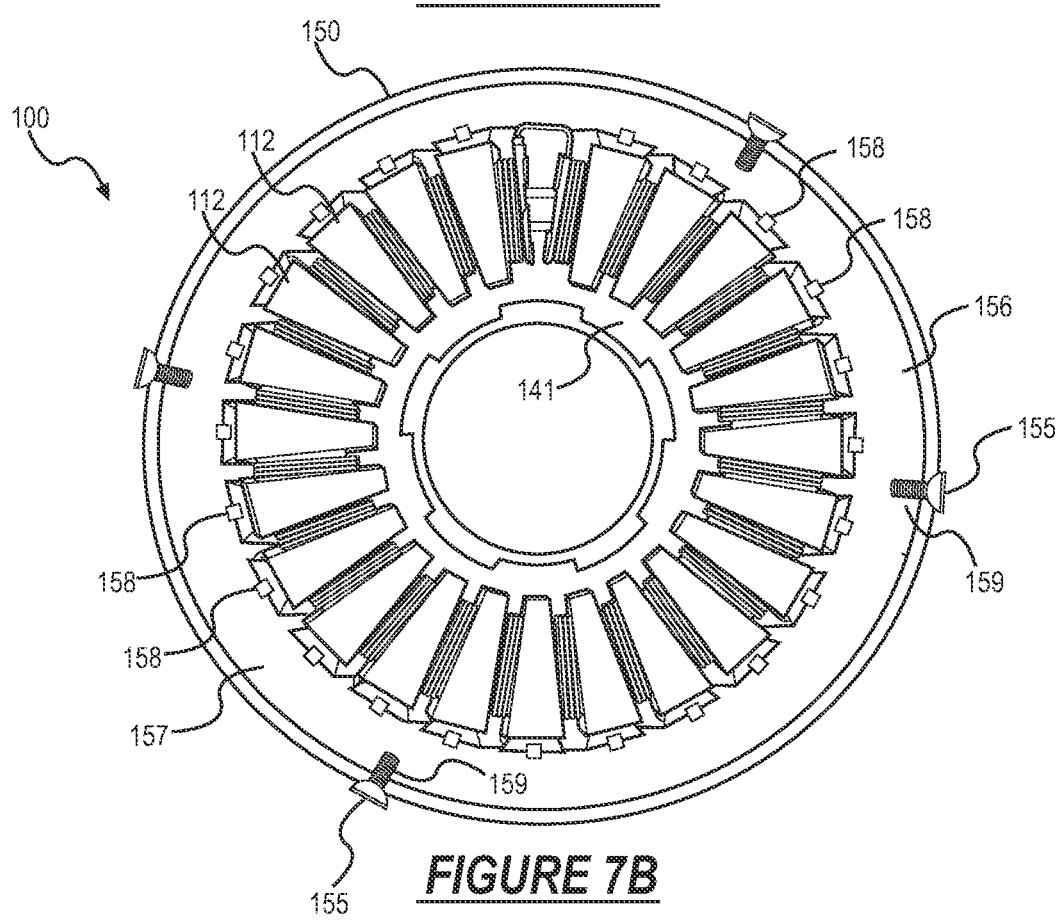
Figure 8:
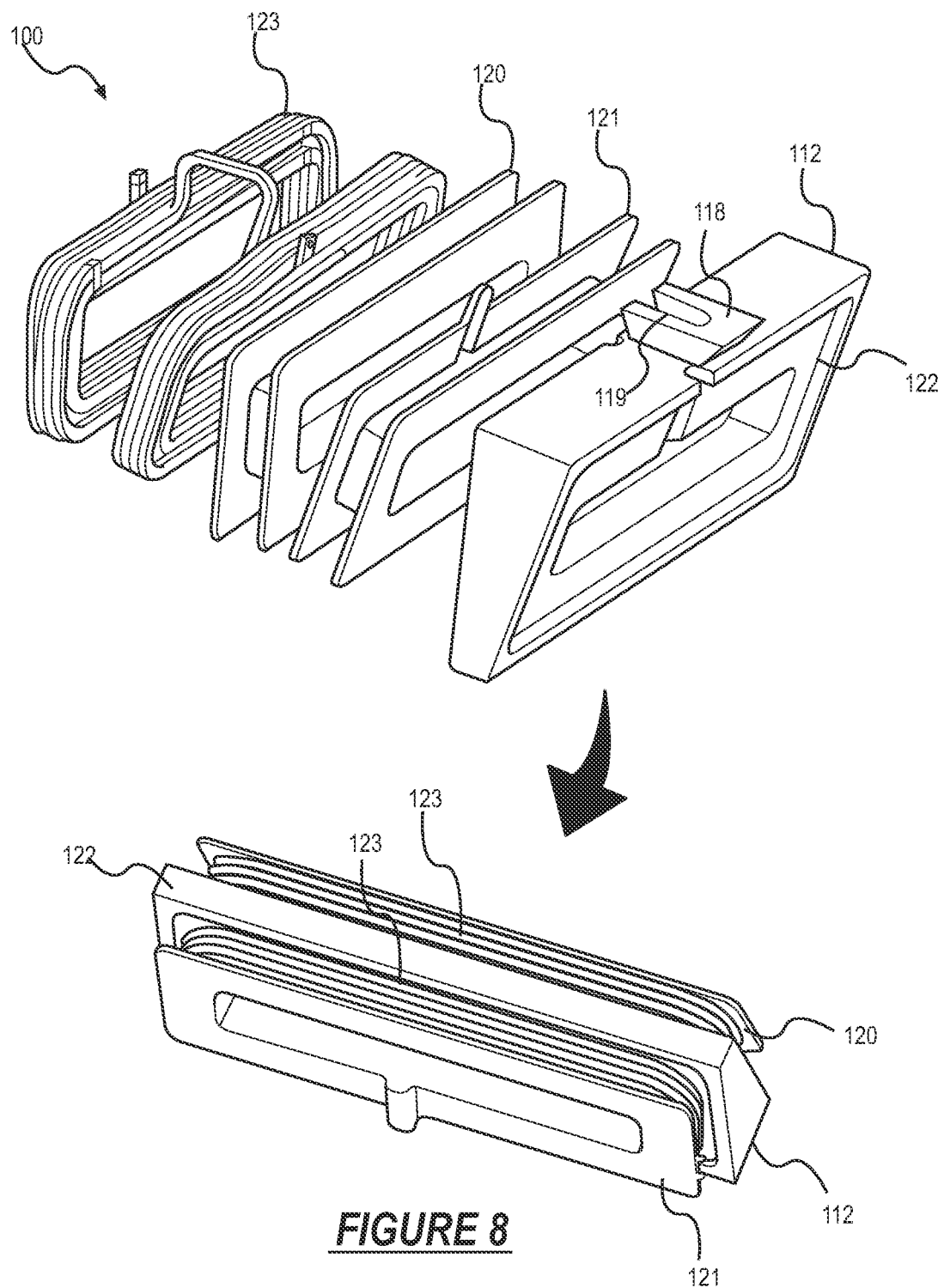
FIG. 8 is a schematic representation of the system.
Figure 9:
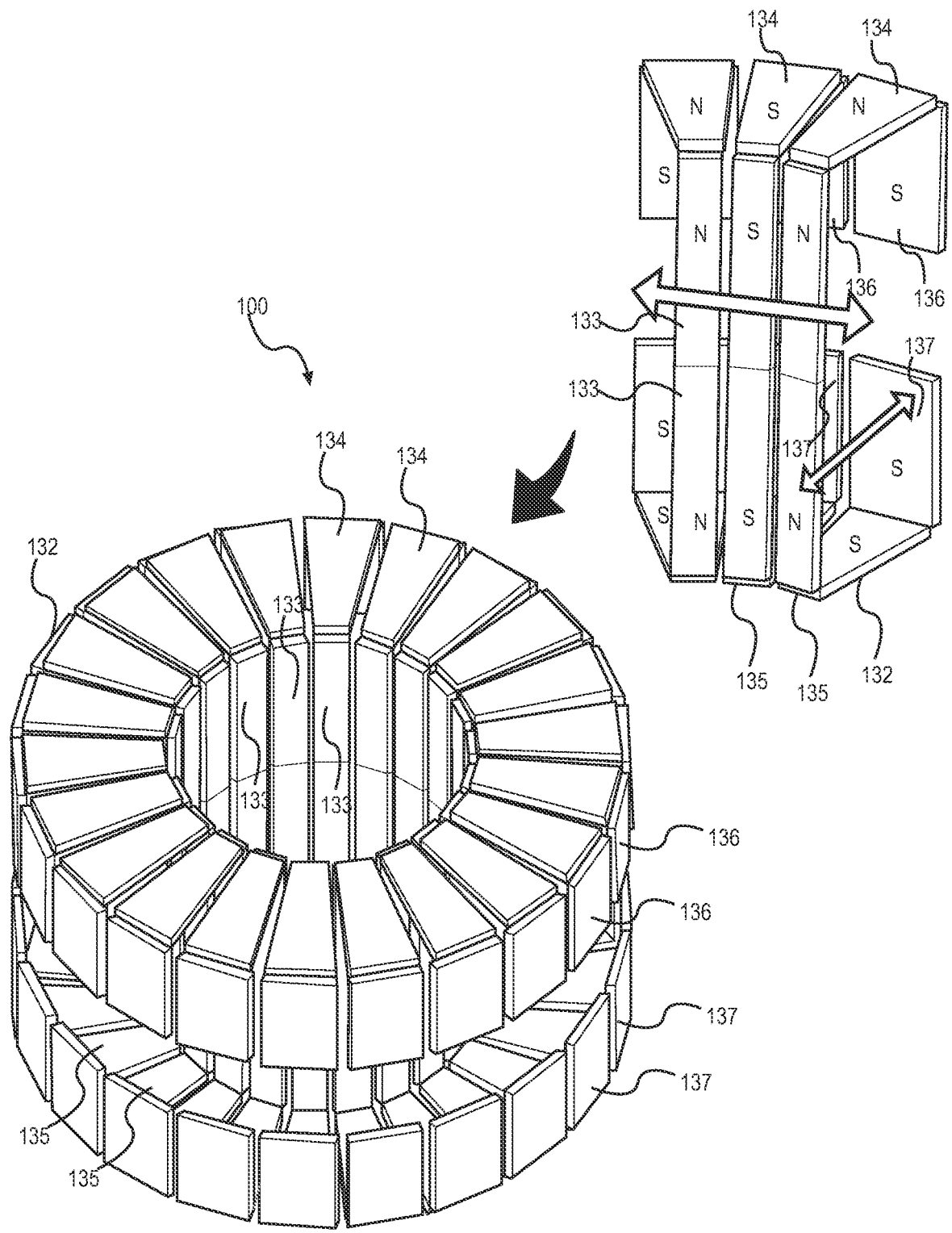
FIG. 9 is a schematic representation of the system.
Figure 10:
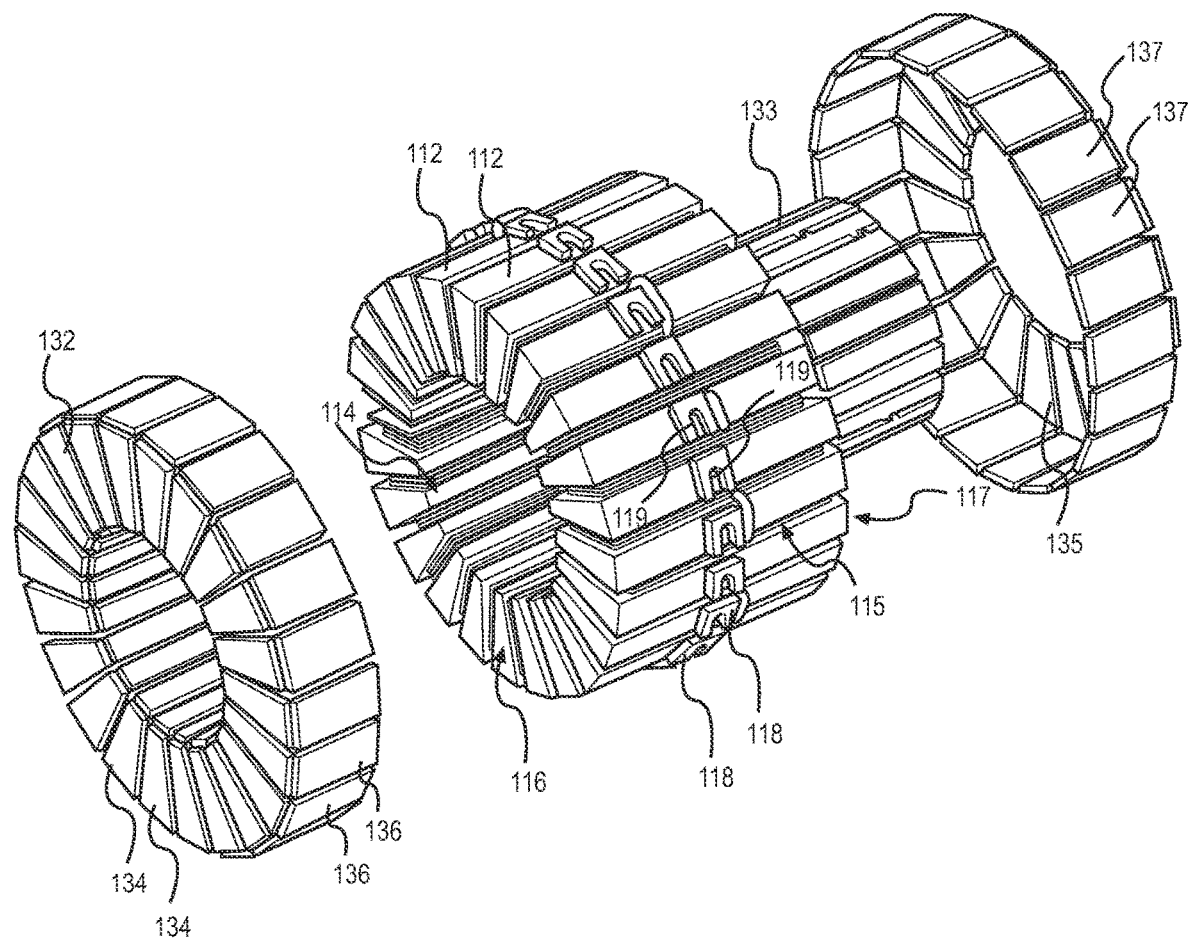
FIG. 10 is a schematic representation of the system.

As shown in FIG. 1, a system 100 for an electric motor includes: a stator 110; a rotor 130; a housing 150; and a controller 190. The stator 110 includes a set of coil assemblies 112: radially arranged about a motor axis 105; and defining an inner radial facet 114, an outer radial facet 115, a first axial facet 116, and a second axial facet 117 opposite the first axial facet 116. Additionally, each coil assembly in the set of coil assemblies 112 includes a receiving member 118 arranged at the outer radial facet 115 of the coil assembly.

Furthermore, the rotor 130 includes a set of magnetic elements 132: encompassing the inner radial facet 114, the outer radial facet 115, the first axial facet 116, and the second axial facet 117 of the set of coil assemblies 112; defining a radial magnetic tunnel about the motor axis 105; and configured to generate a flux density distribution focused toward the set of coil assemblies 112.

The housing 150: contains the stator 110 and the rotor 130; engages the receiving member 118 of each coil assembly, in the set of coil assemblies 112 to couple the housing 150 to the stator 110; and includes a shaft 170 coaxial with the motor axis 105 and coupled to the rotor 130.

The controller 190 is configured to drive current through the set of coil assemblies 112 to generate a toroidal magnetic field tunnel configured to sequentially and magnetically couple the set of magnetic elements 132 contained within the housing 150.

2. Applications

Generally, the system 100 can function as an electric motor for heating, ventilation, and air conditioning (hereinafter "HVAC") applications and includes a rotor 130 configured to direct magnetic fields across all surfaces of a stator 110 contained within the rotor 130. In particular, the stator 110 includes a set of coil assemblies 112 radially arranged about a motor axis 105 to define a cylindrical stator ring. Additionally, the rotor 130 includes a set of magnetic elements 132 arranged about axial facets and radial facets of the cylindrical stator ring, thereby encompassing the stator 110 within a magnetic flux tunnel. Furthermore, the system 100 includes a housing 150: containing the rotor 130 and the stator 110; rigidly coupled to the set of coil assemblies 112 of the stator 110 contained within the housing 150; and including a shaft 170 coupled to the rotor 130. A controller 190 can then drive current (e.g., DC current, AC current) through the set of coil assemblies 112 in order to generate magnetic fields to then induce magnetic flux linkage between the rotor 130 and the stator 110 across all facets (i.e., axial facets and radial facets) of the rotor 130, thereby enabling the rotor 130 to rotate freely (e.g., at 1500 rpms) within the housing 150. Thus, the system 100 defines a rigid outer housing 150 and can therefore be easily integrated into existing HVAC systems with minimal dismantling of the existing HVAC system 100.

In one example, each coil assembly in the set of coil assemblies 112 includes a receiving member 118 arranged at the outer radial facet 115 of the set of coil assemblies 112. In this example, the receiving member 118 can define a protrusion at the outer radial facet 115 and includes a threaded cavity 119 that faces an interior radial wall of the housing 150 containing the rotor 130 and the stator 110. Additionally, the set of magnetic elements 132 of the rotor 130 envelops the set of coil assemblies 112 to define a radial slot—about the outer radial facet 115 of the set of coil assemblies 112—that exposes the receiving member 118 of each coil assembly in the set of coil assemblies 112. The housing 150 can include: a base 151; a cylindrical body 152 extending from the base 151; and a cover 154 arranged opposite from the base 151 to define a cavity that contains the set of coil assemblies 112 and the set of magnetic elements 132 therein. Furthermore, the cylindrical body 152 can include a set of fastening members 155 arranged at an inner side of the cylindrical body 152 that: couple the receiving member 118 of each coil assembly in the set of coil assemblies 112; and defines an interstice 156 between the set of magnetic elements enveloping the set of coil assemblies 112 and the inner side of the cylindrical body 152. Thus, the system 100 can rigidly maintain the stator 110 and the housing 150 during rotation of the rotor 130—and thereby the shaft 170—within the housing 150.

In another example, the system 100 further includes a coupling ring 157: interposed between the outer radial facet 115 of the set of coil assemblies 112 and the inner wall of the housing 150; and defining an interstice 156 between the set of magnetic elements 132 and the inner wall of the housing 150. In this example, the coupling ring 157 can include a set of fastening members arranged within an inner radial side of the coupling ring 157; and mounted to the receiving member 118 of each coil assembly, in the set of coil assemblies 112, to rigidly couple the ring about the set of coil assemblies 112. Additionally, the housing 150 can include a set of apertures 153 arranged about the cylindrical body 152 of the housing 150 that are in alignment with a set of threaded cavities 159 arranged about the outer radial side of the coupling ring 157. The system 100 can then further include a set of fastening members 155, received through the set of apertures 153 at the housing 150, and coupled to the set of threaded cavities 159 of the coupling ring 157, thereby rigidly mounting the housing 150 to the set of coil assemblies 112.

Therefore, the system 100 can include a housing 150: containing a set of coil assemblies 112 and a set of magnetic elements 132 encompassing the set of coil assemblies 112; and mounted to the set of coil assemblies 112 to define an interstice 156 between the set of magnetic elements 132 and the inner wall of the housing 150, thereby enabling the rotor 130 to rotate freely within the housing 150 while simultaneously inducing magnetic flux linkage on all facets (i.e., radial facets, axial facets) on the set of coil assemblies 112.

3. Stator

Generally, the system 100 includes a stator 110 including: a set of coil assemblies 112 arranged in a radial pattern about a motor axis 105; and a stator yoke 124 supporting the set of coil assemblies 112 in the radial pattern about the motor axis 105. In particular, each coil assembly, in the set of coil assemblies 112 can include: a first bobbin 120 coupled to the stator yoke 124; a winding 123 wound about a winding 123 receiving slot of the first bobbin 120 and including a first set of leads; and a stator pole 122 arranged adjacent the first bobbin 120 at the stator pole 122 and formed of a ferrous material (e.g., steel, cast iron, wrought iron, aluminum, copper, lead). Each coil assembly is then coupled to the stator yoke 124 to form a cylindrical stator ring about the motor axis 105 that defines: an inner radial facet 114; an outer radial facet 115; a first axial facet 116; and a second axial facet 117 opposite the first axial facet 116. The system 100 can further include a controller 190: connected to the first set of leads for each coil assembly 112, in the set of coil assemblies 112; and configured to sequentially drive current (e.g., AC current, DC current) through the set of coil assemblies 112 in order to sequentially generate a toroidal magnetic field that then couples the set of magnetic elements 132 of the rotor 130.

3.1 Coil Assemblies

In one implementation, the system 100 includes each coil assembly 112, in the set of coil assemblies 112 including: a first bobbin 120; a second bobbin 121, a stator pole 122; and a winding 123. In this implementation, the first bobbin 120, the second bobbin 121, the stator pole 122, and the winding 123 cooperate with each other to form a pole tunnel segment of the cylindrical stator ring. In particular, the first bobbin 120 can define: a first aperture (e.g., a circular opening); and a first winding receiving slot (e.g., a recessed channel) about an exterior of the first bobbin 120. The second bobbin 121: is arranged opposite the first bobbin 120; defines a second aperture (e.g., circular opening) in alignment with the first aperture of the first bobbin 120; and defines a second winding 123 receiving slot (e.g., recessed channel) about an exterior of the second bobbin 121.

In the aforementioned implementation, the stator pole 122: is formed of a ferrous material (e.g., steel, cast iron, wrought iron, aluminum, copper, lead); is interposed between the first bobbin 120 and the second bobbin 121; defines a third aperture (e.g., circular opening) in alignment with the first aperture of the first bobbin 120 and the second aperture of the second bobbin 121, which forms the pole tunnel segment for the cylindrical stator ring; and includes the receiving member 118 arranged at an outer radial side of the stator pole 122, which faces an inner wall of the housing 150 when the cylindrical stator ring is contained within the housing 150. In one example, the receiving member 118: defines a protrusion (e.g., U-shaped protrusion, O-Shaped protrusion) extending from the outer radial side of the stator pole 122; and includes a threaded cavity configured to receive a fastening element (e.g., bolt, threaded fastener). Furthermore, the winding 123: is coiled about the first winding receiving slot of the first bobbin 120 and the second winding 123 receiving slot of the second bobbin 121; and includes a first set of leads that are then coupled to the controller 190.

The system 100 can then replicate this structure for each coil assembly 112, in the set of coil assemblies 112, and mount the set of coil assemblies 112 to the stator yoke 124 to then form the cylindrical stator ring. The controller 190 is then connected to the first set of leads of each coil assembly 112, in the set of coil assemblies 112, which then enables for the system 100 to selectively drive current through the set of coil assemblies 112.

In one example, the system 100 can include twenty-one coil assemblies, each mounted to the stator yoke 124, to define the cylindrical stator ring. In this example, each of the coil assemblies, in the twenty-one coil assemblies, includes a set of leads that are coupled to the controller 190. The controller 190 can then sequentially drive current through each coil assembly 112, in the set of coil assemblies 112, to then generate a toroidal magnetic field that couples the set of magnetic elements 132 of the rotor 130, thereby enabling rotation of the rotor 130 enveloping the set of coil assemblies 112.

Therefore, the system 100 can include a set of coil assemblies 112 that define a cylindrical stator ring configured to generate a toroidal magnetic field that couples the set of magnetic elements 132 arranged at each facet (e.g., radial facets and axial facets) of the cylindrical stator ring, thereby enabling rotation of the rotor 130.

3.2 Stator Yoke

In one implementation, the system 100 includes the set of coil assemblies 112 mounted to a stator yoke 124 to define the cylindrical stator ring. In this implementation, the stator yoke 124: defines a cylindrical body 152 about the motor axis 105; and receives each coil assembly 112, in the set of coil assemblies 112, via the pole tunnel segment. Each coil assembly 112, in the set of coil assemblies 112, is then mounted to the stator yoke 124 to form the cylindrical stator ring.

In one example, the stator yoke 124 includes: a first yoke segment 125; and a second yoke segment 126. In this example, the first yoke segment 125: defines a first semi-circular arc; and extends radially about the motor axis 105. Additionally, the second yoke segment 126: defines a second semi-circular arc; extends radially about the motor axis 105; is coupled to a first end and a second end of the first yoke segment 125; and cooperates with the first yoke segment 125 to define a cylindrical stator yoke 124. In this example, the set of coil assemblies 112 includes: a first subset of coil assemblies 112 defining a first tunnel segment configured to receive the first yoke segment 125; and a second subset of coil assemblies 112 defining a second tunnel segment and configured to receive the second yoke segment 126.

In the aforementioned example, the first subset of coil assemblies 112 can be assembled onto the first yoke segment 125 and the second subset of coil assemblies 112 can be assembled onto the second yoke segment 126 independently from one another. Subsequently, the assembled first stator yoke 124 can be coupled to the first end and the second end of the assembled second stator yoke 124, such as by welding, pressure sensitive adhesives, and/or fastening, thereby forming the cylindrical stator ring.

Therefore, the system 100 can include a stator yoke 124 to support and maintain the set of coil assemblies 112 in a circular configuration, thereby enabling the formation of a toroidal magnetic field responsive to driving current through the set of coil assemblies 112 during operation of the system 100.

3.3 3-Phase Configuration: 120 Degrees

In one implementation, the system 100 includes a set of coil assemblies 112 including: a first subset of coil assemblies 112; a second subset of coil assemblies 112; and a third subset of coil assemblies 112. In this implementation, the first subset of coil assemblies 112, the second subset of coil assemblies 112, and the third subset of coil assemblies 112 cooperate to form a 3-phase configuration for the electric motor. In particular, the system 100 can sequentially drive current through the first subset of coil assemblies 112, the second subset of coil assemblies 112, and the third subset of coil assemblies 112 to magnetically couple the set of magnetic elements 132 of the rotor 130 in a 3-phase configuration (e.g., delta configuration, wye configuration).

For example, the system 100 can include a first subset of coil assemblies 112 defining a first phase winding 123 for the electric motor and including: a first set of bobbins arranged radially about the motor axis 105; a first set of windings 123 wound about the first set of bobbins; a first set of stator poles 122 interposed between the first set of bobbins; and a first set of leads coupled to the controller 190. Additionally, the system 100 can include a second subset of coil assemblies 112 defining a second phase winding 123, different from the first phase winding 123, of the electric motor and including: a second set of bobbins arranged radially about the motor axis 105 adjacent the first set of bobbins; a second set of windings 123 wound about the second set of bobbins; a second set of stator poles 122 interposed between the second set of bobbins; and a second set of leads coupled to the controller 190. Furthermore, the system 100 can include a third subset of coil assemblies 112 defining a third phase winding 123, different from the first phase winding 123 and the second phase winding 123, of the electric motor. The third subset of coil assemblies 112 includes: a third set of bobbins arranged radially about the motor axis 105 adjacent the first set of bobbins and the second set of bobbins; a third set of windings 123 wound about the third set of bobbins; a third set of stator poles 122 interposed between the third set of bobbins; and a third set of leads coupled to the controller 190. In this example, the third subset of coil assemblies 112 cooperates with the first subset of coil assemblies 112, the second subset of coil assemblies 112, and the third subset of coil assemblies 112 to define a 3-phase configuration for the electric motor.

Thus, the system 100 can sequentially drive current through the first subset of coil assemblies 112, the second subset of coil assemblies 112, and the third subset of coil assemblies 112, thereby sequentially and magnetically coupling the set of magnetic elements 132 of the rotor 130 to enable rotation of the rotor 130.

3.4 3-Phase Configuration: 180 Degrees

In another implementation, these subsets of coil assemblies can include coil assemblies connected in series to each other and arranged at opposing angular offsets (i.e., 180-degree offset) about the stator yoke 124. As a result, the system 100 can then sequentially drive current to these subsets of coil assemblies in order to sequentially generate the magnetic fields directed to the set of magnetic elements 132 of the rotor 130.

For example, the set of coil assemblies 112 can include a first subset of coil assemblies 112 including: a first coil assembly; and a second coil assembly connected in series with the first coil assembly and arranged 180 degrees opposite the first coil assembly. Additionally, the set of coil assemblies 112 can include a second subset of coil assemblies 112 including: a third coil assembly angularly offset from the first coil assembly; and a fourth coil assembly arranged 180 degrees opposite the third coil assembly and connected in series with the third coil assembly. In this example, the controller 190 can then sequentially drive current to the first subset of coil assemblies 112 and the second subset of coil assemblies 112 to sequentially generate magnetic fields about the rotor 130 that couple the set of magnetic elements 132 about the rotor 130 to enable rotation of the rotor 130.

Additionally, the set of coil assemblies 112 can also include a third subset of coil assemblies 112 arranged in a similar configuration as described above to form the three-phase configuration for the set of coil assemblies 112 of the stator 110.

Therefore, the system 100 can: sequentially generate opposing magnetic fields at the set of coil assemblies 112 directed to each surface of the rotor 130 in order to sequentially induce magnetic flux coupling to the rotor 130 within the set of coil assemblies 112, thereby continuously urging the stator poles of the set of coil assemblies 112 to align with the set of magnetic elements 132 of the rotor 130 to spin the rotor 130 about the set of coil assemblies 112.

4. Rotor

Generally, the system 100 includes a rotor 130 including a set of magnetic elements 132: encompassing the set of coil assemblies 112; defining a radial magnetic tunnel about the motor axis 105; and configured to generate a flux density distribution focused toward the set of coil assemblies 112. In particular, the set of magnetic elements 132 are arranged across the inner radial facet 114, the outer radial facet 115, the first axial facet 116, and the second axial facet 117 of the set of coil assemblies 112, thereby enveloping the set of coil assemblies 112 to form the radial magnetic tunnel. Thus, when the system 100 drives current through the set of coil assemblies 112, the stator poles 122 of the set of coil assemblies 112 magnetically couple the set of magnetic elements 132 at each facet of the cylindrical stator ring, thereby rotating the rotor 130.

4.1 Magnetic Flux Tunnel

In one implementation, the system 100 includes the set of magnetic elements 132: encompassing the inner radial facet 114, the outer radial facet 115, the first axial facet 116, and the second axial facet 117 of the cylindrical stator ring; and defining a radial slot about the outer radial facet 115 of the cylindrical stator ring exposing the receiving member 118 of each coil assembly 112, in the set of coil assemblies 112. In this implementation, the set of magnetic elements 132 can form a C-shape configuration that partially extends across the outer radial facet 115 of the cylindrical stator ring to define the radial slot. Thus, when the set of coil assemblies 112 and the set of magnetic elements 132 are contained within the housing 150, the receiving members 118 of each coil assembly face the inner wall of the housing 150.

In one example, the system 100 includes a set of magnetic elements 132 including: a subset of inner radial magnetic elements 133 arranged in a radial pattern about the inner radial facet 114 of the set of coil assemblies 112; a first subset of axial magnetic elements 134 arranged in a radial pattern about the first axial facet 116 of the set of coil assemblies 112; and a second subset of axial magnetic elements 135 arranged in a radial pattern about the second axial facet 117 of the set of coil assemblies 112. Additionally, the set of magnetic elements 132 can include a first subset of outer radial magnetic elements 136: arranged normal the first subset of axial magnetic elements 134; and extending partially across the outer radial facet 115 of the set of coil assemblies 112. Furthermore, the set of magnetic elements 132 includes a second subset of outer radial magnetic elements 137: arranged normal the second subset of axial magnetic elements 135; extending partially across the outer radial facet 115 of the set of coil assemblies 112; and cooperating with the first subset of outer radial magnetic elements 136 to define a radial slot exposing the receiving member 118 of each coil assembly, in the set of coil assemblies 112, arranged about outer radial facet 115.

Therefore, the system 100 includes a set of magnetic elements 132 encompassing the facets of the cylindrical stator ring and defining a radial slot exposing the receiving member 118 of each coil assembly, in the set of coil assemblies 112, in order to: enable magnetic flux linkage about each facet of the set of coil assemblies 112 during operation of the electric motor; and enable the housing 150 to rigidly couple the set of coil assemblies 112 at the receiving member 118 of the coil assembly.

4.2 Halbach Configuration

In one implementation, as described in U.S. application Ser. No. 17/979,615, the system 100 can include a set of magnetic elements 132: arranged in a Halbach array configuration about the inner radial facet 114, the outer radial facet 115, the first axial facet 116, and the second axial facet 117 of the set of coil assemblies 112; and configured to generate a flux density distribution directed toward the set of coil assemblies 112.

In one example, the system 100 includes a set of inner radial magnetic elements: arranged in a first Halbach array configuration about the inner radial facet 114 of the stator 110; and defining a first flux density distribution focused toward the inner radial facet 114. Additionally, the system 100 includes a set of outer radial magnetic elements: arranged in a second Halbach array configuration, in alignment with the first Halbach array configuration, about the outer radial facet 115 of the stator 110; and defining a second flux density distribution focused toward the outer radial facet 115.

In the aforementioned example, the system 100 further includes a first set of axial magnetic elements: arranged in a third Halbach array configuration about the first axial facet 116 of the stator 110; and defining a third flux density distribution focused toward the first axial facet 116. Furthermore, the system 100 includes a second set of axial magnetic elements: arranged in a fourth Halbach array configuration, in alignment with the third Halbach array configuration, about the second axial facet 117 of the stator 110; defining a fourth flux density distribution focused toward the second axial facet 117; and cooperating with the set of inner radial magnetic elements, the set of outer radial magnetic elements, and the first set of axial magnetic elements to form a magnetic flux tunnel enveloping the set of coil assemblies 112.

Therefore, the system 100 can include a set of magnetic elements 132 configured to direct a flux density distribution at each facet of the cylindrical stator ring, thereby increasing strength of the magnetic coupling between the stator poles 122 of the set of coil assemblies 112 and the set of magnetic elements 132 of the rotor 130.

4.3 Unitary Rotor Core

In one implementation, the system 100 includes a rotor core: encompassing the set of coil assemblies 112; and supporting the set of magnetic elements 132 to face the inner radial facet 114, the outer radial facet 115, the first axial facet 116, and the second axial facet 117. In this implementation, the rotor core includes a set of receiving slots configured to receive the set of magnetic elements 132, and locates the set of magnetic elements 132 to face the set of coil assemblies 112 to define the radial magnetic tunnel. In this implementation, the rotor core can define a C-shaped structure that: encompasses the set of coil assemblies 112; and defines the radial slot to expose the receiving member 118 of each coil assembly.

For example, the system 100 can include the rotor 130 including an inner rotor core: arranged within an inner radius of the set of coil assemblies 112; defining a set of inner slots arranged about the inner rotor core; and including a subset of inner radial magnetic elements 133, in the set of magnetic elements 132, arranged at the set of inner slots and facing the inner radial facet 114 of the set of coil assemblies 112. Additionally, the rotor 130 includes an outer rotor core including: a first outer plate, a second outer plate, and an outer radial wall. The first outer plate: is coupled to the inner rotor core; defines a first set of outer slots; and includes a first subset of axial magnetic elements 134, in the set of magnetic elements 132, arranged at the first set of outer slots and facing the first axial facet 116 of the set of coil assemblies 112. Additionally, the second outer plate: is arranged opposite the first outer plate; defines a second set of outer slots; and includes a second subset of axial magnetic elements 135, in the set of magnetic elements 132, arranged at the second set of outer slots and facing the second axial facet 117 of the set of coil assemblies 112. Furthermore, the outer radial wall: is interposed between the first outer plate and the second outer plate; defines a set of outer slots arranged about the outer radial wall; and includes a subset of outer radial magnetic elements, in the set of magnetic elements 132, arranged at the set of outer slots and facing the outer radial facet 115 of the set of coil assemblies 112.

In the aforementioned example, the shaft 170 is rigidly coupled to the inner rotor core and set in alignment with the motor axis 105. Thus, the system 100 can drive current through the set of coil assemblies 112 to generate a toroidal magnetic field that magnetically couples the set of magnetic elements 132 facing each facet of the set of coil assemblies 112, thereby rotating the rotor 130.

4.4 Dual Rotor Core

In one implementation, the system 100 includes an upper rotor core: spanning the first axial facet 116 of the set of coil assemblies 112; and partially extending across the inner radial facet 114 and the outer radial facet 115 of the set of coil assemblies 112. Additionally, the system 100 includes a lower rotor core: arranged opposite the upper rotor core; spanning the second axial facet 117 of the set of coil assemblies 112; and partially extending across the inner radial facet 114 and the outer radial facet 115 of the set of coil assemblies 112. In this implementation, the upper rotor core and the lower rotor core cooperate to define the radial slot exposing the receiving member 118 of each coil assembly. Furthermore, the upper rotor core and the second rotor core are coupled to each other such that when the system 100 drives current through the set of coil assemblies 112, the upper rotor core and the lower rotor core simultaneously rotate about the motor axis 105.

In one example, the system 100 includes a rotor 130 including a first radial plate 140: encompassing the first axial facet 116 of the set of coil assemblies 112; and including a first subset of axial magnetic elements 134, in the set of magnetic elements 132, arranged in a radial pattern facing a first axial facet 116 of the set of coil assemblies 112. Additionally, the rotor 130 includes a first inner rotor core 141: arranged within an inner radius of the set of coil assemblies 112; extending a first length less than a length of the inner radial facet 114 of the set of coil assemblies 112; centrally coupled to the first radial plate 140; and including a first subset of inner radial magnetic elements 133, in the set of magnetic elements 132, arranged in a radial pattern facing the inner radial facet 114 of the set of coil assemblies 112. Furthermore, the rotor 130 includes a first outer radial wall 142: extending about an outer radius of the first radial plate 140; partially encompassing the outer radial facet 115 of the set of coil assemblies 112; and including a first subset of outer radial magnetic elements 136, in the set of magnetic elements 132, arranged in a radial pattern facing the first axial facet 116 of the set of coil assemblies 112. In this example, the shaft 170 of the housing 150: extends outwardly from the first radial plate 140 coaxial with the motor axis 105; and is rigidly coupled to the first inner rotor core 141.

In the aforementioned example, the rotor 130 further includes a second radial plate 143: arranged opposite the first radial plate 140; encompassing the second axial facet 117 of the set of coil assemblies 112; and including a second subset of axial magnetic elements 135, in the set of magnetic elements 132, arranged in a radial pattern facing a second axial facet 117 of the set of coil assemblies 112. Additionally, the rotor 130 includes a second inner rotor core 144: arranged opposite the first inner rotor core 141 within the inner radius of the set of coil assemblies 112; extending a second length, matching the first length of the first inner rotor core 141, and less than the length of the inner radial facet 114 of the set of coil assemblies 112; centrally coupled to the second radial plate 143; and including a second subset of inner radial magnetic elements 133, in the set of magnetic elements 132, arranged in a radial pattern facing the inner radial facet 114 of the set of coil assemblies 112. Furthermore, the rotor 130 includes a second outer radial wall 145: extending about an outer radius of the second radial plate 143; partially encompassing the outer radial facet 115 of the set of coil assemblies 112; including a second subset of outer radial magnetic elements 137, in the set of magnetic elements 132, arranged in a radial pattern facing the second axial facet 117 of the set of coil assemblies 112; and cooperating with the first outer radial wall 142 to define a radial slot exposing the receiving member 118 of each coil assembly, in the set of coil assemblies 112, arranged about the outer radial facet 115. In this example, the shaft 170 of the housing 150 is also coupled to the second inner rotor core 144.

Therefore, the system 100 can include an upper rotor core and a lower rotor core that: envelops the set of coil assemblies 112; supports the set of magnetic elements 132 to face the set of coil assemblies 112; and defines a radial slot about the outer radial facet 115 of the set of coil assemblies 112 to expose the receiving member 118 of each coil assembly 112, thereby enabling the housing 150 to directly couple the receiving member 118 of the coil assembly when containing the set of coil assemblies 112 and the set of magnetic elements 132.

5. Controller

In one implementation, the system 100 includes the controller 190 configured to drive current (e.g., AC current, DC current) through the set of coil assemblies 112 to generate a magnetic field at the set of stator poles 122 coupling the set of magnetic elements 132 of the rotor 130, thereby rotating the rotor 130 about the set of coil assemblies 112.

In one example, the controller 190 can be configured to switch polarity of current supplied to the set of coil assemblies 112 in order to enable rotation of the rotor 130. Furthermore, the controller 190 can be configured to modulate frequency and amplitude of the current supplied to the set of coil assemblies 112, thereby modifying speed and direction of rotation for the shaft 170 coupled to the rotor 130 in order to satisfy a particular mode of operation (e.g., pump motor operation, vehicle motor operation, HVAC operation) for the electric motor.

6. Housing

Generally, the system 100 includes a housing 150 that contains the set of coil assemblies 112 and the set of magnetic elements 132. In particular, the housing 150 includes: a base 151, a cylindrical body 152 extending from the base 151; and a cover 154. The cover 154: is arranged opposite the base 151; is coupled to a distal end of the cylindrical body 152 to define a cavity configured to locate the set of coil assemblies 112 and the rotor 130 within the housing 150; and including a shaft 170 opening that receives the shaft 170 in alignment with the motor axis 105. The housing 150 locates the set of coil assemblies 112 within the cavity such that the receiving member 118 of each coil assembly, in the set of coil assemblies 112, faces an inner wall of the cylindrical body 152. The housing 150 can then include a set of fastening members 155 that is inserted about the cylindrical body 152 of the housing 150 and couples the receiving member 118 of the coil assembly. Thus, when the system 100 drives current through the set of coil assemblies 112 to rotate the rotor 130, the housing 150 maintains rigid coupling to the stator 110, thereby: rotating the rotor 130 within the cavity of the housing 150; and simultaneously rotating the shaft 170 coupled to the rotor 130 located within the housing 150.

6.1 Housing Integration: Fastener

In one implementation, the system 100 includes the housing 150 directly coupled to the receiving member 118 of each coil assembly, in the set of coil assemblies 112, located within the cavity of the housing 150. In this implementation, the system 100 includes: the set of coil assemblies 112 located within the housing 150 and including the set of receiving members 118 of each coil assembly facing an inner wall of the cylindrical body 152; the rotor 130 located within the housing 150 and encompassing the set of coil assemblies 112 to define a radial slot exposing the receiving member 118 of each coil assembly; and a set of fastening members 155 received about the cylindrical body 152 of the housing 150 and coupling the receiving member 118 of each coil assembly to define an interstice 156 between the rotor 130 and the inner wall of the cylindrical body 152.

In the aforementioned implementation, the receiving member 118 of each coil assembly protrudes outwardly from the outer radial facet 115 of the cylindrical stator ring and defines a threaded cavity 119 that faces the inner wall of the cylindrical body 152 of the housing 150. The set of fastening members 155 are then coupled to the threaded cavity 119 of the receiving member 118 in order to rigidly couple the housing 150 to the set of coil assemblies 112. Thus, when the controller 190 drives current through the set of coil assemblies 112 to rotate the rotor 130, the rotor 130 freely spins within the cavity without direct contact to the inner wall of the cylindrical body 152.

In one example, the system 100 includes the housing 150 including a set of apertures 153: radially arranged about a cylindrical body 152 of the housing 150; and aligned with the receiving member 118 of each coil assembly, in the set of coil assemblies 112. Additionally, the system 100 includes the set of fastening members 155 received through the set of apertures 153 at the cylindrical body 152. The set of fastening members 155 then engages the threaded cavity 119 of the receiving member 118 of each coil assembly, in the set of coil assemblies 112 to: rigidly couple the housing 150 to the stator 110; and define an interstice 156 between an inner radial wall of the housing 150 and a subset of outer radial magnetic elements, in the set of magnetic elements 132, encompassing the outer radial facet 115 of the set of coil assemblies 112.

Therefore, the system 100 includes a housing 150: locating the set of coil assemblies 112 and the rotor 130 within a cavity of the housing 150; and maintaining rigid coupling between the set of coil assemblies 112 and the housing 150, thereby enabling free rotation of the rotor 130 within the cavity of the housing 150.

6.2 Housing Integration: Coupling Ring

In one implementation, the system 100 includes a housing 150 including a coupling interposed between the outer radial facet 115 of the cylindrical stator ring and the inner wall of the cylindrical body 152 of the housing 150. In this implementation, the coupling ring 157: envelops the set of coil assemblies 112; is coupled to the receiving member 118 of each coil assembly; and abuts with the inner wall of the cylindrical body 152, thereby defining the interstice 156 between the rotor 130 enveloping the set of coil assemblies 112 and the inner wall of the cylindrical body 152.

In the aforementioned implementation, the system 100 includes: the rotor 130 enveloping the set of coil assemblies 112 to define a radial slot about the outer radial facet 115 of the cylindrical stator ring; and the coupling ring 157 located about the radial slot and coupled to the receiving member 118 of each coil assembly, in the set of coil assemblies 112. The coupling ring 157 can then define a ring diameter greater than a diameter of the rotor 130 enveloping the set of coil assemblies 112 and less than a diameter of the cylindrical body 152, such that the coupling ring 157 is maintained abutting with the inner wall of the cylindrical housing 150 when the rotor 130 and stator 110 are contained within the housing 150.

In one example, the system 100 includes the housing 150 including a coupling ring 157: interposed between the outer radial facet 115 of the set of coil assemblies 112 and an inner radial wall of the housing 150; and defining an interstice 156 between the inner radial wall of the housing 150 and a subset of outer radial magnetic elements, in the set of magnetic elements 132, encompassing the outer radial facet 115 of the set of coil assemblies 112. Additionally, the coupling ring 157 includes: a first set of coupling members 158 radially arranged about an inner radius of the coupling ring 157 and coupled to the receiving member 118 of each coil assembly, in the set of coil assemblies 112; and a first set of threaded cavities 159 arranged about an outer radius of the coupling ring 157. Furthermore, the system 100 includes a set of fastening members 155 coupled to the first set of threaded cavities 159 to rigidly couple the housing 150 to the set of coil assemblies 112.

Therefore, the system 100 can include: a housing 150 containing the set of coil assemblies 112 and the rotor 130; and a coupling ring 157 interposed between the set of coil assemblies 112 and an inner wall of the housing 150 to define an interstice 156 between the rotor 130 and an inner wall of the housing 150, thereby allowing for the rotor 130 to spin freely within the cavity of the housing 150 during operation of the system 100.

6.3 Heat Dissipation

During operation of the system 100, the rotor 130 spins within the housing 150 and generates heat that can degrade performance of the system 100. Thus, the system 100 can implement fluid cooling, heatsinks, vents, baffles, and/or fans in order to reduce temperature during operation of the system 100.

In one implementation, the system 100 includes the coupling ring 157: interposed between the set of coil assemblies 112 and the housing 150; and configured to form a heat sink configured to draw heat from the set of coil assemblies 112 to the base 151, cylindrical body 152, and cover 154 of the housing 150. In this implementation, the system 100 can then dissipate heat transferred to the housing 150, such as by conduction, natural convection, forced convection, and/or thermal radiation, to a lower temperature region (e.g., ambient air). Additionally, the coupling ring 157 can include a thermal conductive coating, such as thermal heatsink paste and/or a thermal pad enveloping outer surfaces of the coupling ring 157 and configured to reduce the operating temperature of the system 100.

In another implementation, the system 100 can include temperature sensors (e.g., heat cameras) coupled to the housing 150 and configured to read temperature values of the housing 150 during operation of the system 100. The system 100 can then implement thermal analysis techniques to the temperatures read from the temperature sensor to determine an operating temperature range of the system 100. In one example, the system 100 can determine a temperature range that exceeds the operating temperature range of the system 100. Thus, the system 100 can modify (e.g., reduce) current sent to the set of coil assemblies 112 in order to reduce the operating temperature of the system 100.

In another implementation, the housing 150 can be formed of a thermal conductive material configured to reduce operating temperature of the system 100. For example, the housing 150 can be formed of copper and/or aluminum.

In another implementation, the system 100 can further include a housing 150 including an arrangement of cooling fins configured to reduce thermal resistance between the coupling ring 157 and the housing 150.

In another implementation, the system 100 includes the housing 150: containing the set of coil assemblies 112 and the rotor 130; and submerged in a cooling liquid. For example, system 100 includes the set of coil assemblies 112 partially and/or fully submerged in oil (e.g., mineral oil) configured to form an immersion-cooling medium for the set of coil assemblies 112. In another example, the liquid cooling medium is formed of a dielectric fluid configured to function as a coolant and provide electric insulation for the set of coil assemblies 112, such that electrical discharges or arching are suppressed.

6.4 Example: Totally Enclosed Fan-Cooled HVAC Electric Motor

In one implementation, the system 100 can form a totally enclosed fan-cooled (TEFC) HVAC electric motor. In this implementation, the housing 150 entirely encloses the rotor 130 and the stator 110, thereby restricting air to circulate through the interior of the housing 150. Thus, the system 100 can include: an external fan configured to direct air to an exterior of the housing 150 in order to reduce the operating temperature of the system 100. For example, the external fan is: coupled to the shaft 170; located at an exterior of the housing 150; and configured to direct air to outer surfaces of the housing 150 to reduce the operating temperature of the system 100. In another example, the system 100 includes an internal fan: located within the housing 150; and configured to direct air toward the set of coil assemblies 112 and the rotor 130 contained within the housing 150 to reduce operating temperature of the system 100.

6.5 Example: Open Drip Proof HVAC Electric Motor

In one implementation, the system 100 can form an open drip proof (ODP) HVAC electric motor. In this implementation, the housing 150 includes vents configured to direct air exterior to the housing 150 toward the interior of the housing 150 in order to reduce the operating temperature of the system 100. The housing 150 can include vents radially arranged at the base 151, cylindrical body 152 and the cover 154.

For example, the system 100 can include a housing 150 including a base 151 including a first set of intake vents 160 radially arranged about the base 151. Additionally, the housing 150 includes a cover 154: arranged opposite the base 151; and including a second set of intake vents 160 radially arranged about the cover 154. Furthermore, the housing 150 includes a cylindrical body 152: interposed between the base 151 and the cover 154 to define a cavity configured to locate the rotor 130 and the stator 110 within the housing 150; and including a set of outtake vents 162 radially arranged about the cylindrical body 152. In this example, during operation of the system 100, air about the exterior of the housing 150 is directed toward an interior of the housing 150 by way of the first set of intake vents 160 and the second set of intake vents 160. Additionally, the air directed to the interior of the housing 150 flows through the set of coil assemblies 112 and the rotor 130, thereby reducing operating temperature of the system 100. The air within the interior of the housing 150 is then dispersed throughout the set of outtake vents 162.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for an electric motor comprising:
   a stator comprising a set of coil assemblies:
      arranged radially about a motor axis;
      defining an inner radial facet, an outer radial facet, a first axial facet, and a second axial facet opposite the first axial facet; and
      each coil assembly in the set of coil assemblies comprising a receiving member arranged at the outer radial facet of the coil assembly;
   a rotor comprising a set of magnetic elements:
      encompassing the inner radial facet, the outer radial facet, the first axial facet, and the second axial facet of the set of coil assemblies;
      defining a radial magnetic tunnel about the motor axis; and
      configured to generate a flux density distribution focused toward the set of coil assemblies;
   a housing:
      containing the stator and the rotor;
      engaging the receiving member of each coil assembly, in the set of coil assemblies, to couple the housing to the stator; and
      comprising a shaft coaxial with the motor axis and coupled to the rotor; and
   a controller configured to drive current through the set of coil assemblies to generate a toroidal magnetic field tunnel configured to sequentially and magnetically couple the set of magnetic elements contained within the housing.

2. The system of claim 1:
   wherein the housing further comprises:
      a base;
      a cylindrical body extending from the base; and
      a cover:
         arranged opposite the base; and
         coupled to a distal end of the cylindrical body to define a cavity configured to locate the rotor and the stator within the housing; and
         comprising a shaft opening; and
   wherein the receiving member of each coil assembly, in the set of coil assemblies, engages an inner radial wall of the cylindrical body to rigidly couple the stator to the housing.

3. The system of claim 1, wherein the receiving member of each coil assembly, in the set of coil assemblies protrudes outwardly from the outer radial facet and defines a threaded cavity.

4. The system of claim 3:
wherein the housing further comprises a set of apertures:
   radially arranged about a cylindrical body of the housing; and
   aligned with the receiving member of each coil assembly, in the set of coil assemblies; and
further comprising a set of fastening members:
   received through the set of apertures at the cylindrical body; and
   engaging the threaded cavity of the receiving member of each coil assembly in the set of coil assemblies to:
      rigidly couple the housing to the stator; and
      define an interstice between an inner radial wall of the housing and a subset of outer radial magnetic elements, in the set of magnetic elements, encompassing the outer radial facet of the set of coil assemblies.

5. The system of claim 1:
wherein the housing further comprises a coupling ring:
   interposed between the outer radial facet of the set of coil assemblies and an inner radial wall of the housing;
   defining an interstice between the inner radial wall of the housing and a subset of outer radial magnetic elements, in the set of magnetic elements, encompassing the outer radial facet of the set of coil assemblies; and
   comprising:
      a first set of coupling members radially arranged about an inner radius of the coupling ring and coupled to the receiving member of each coil assembly, in the set of coil assemblies; and
      a first set of threaded cavities arranged about an outer radius of the coupling ring; and
further comprising a set of fastening members coupled to the first set of threaded cavities to rigidly couple the housing to the set of coil assemblies.

6. The system of claim 1, wherein each coil assembly, in the set of coil assemblies, further comprises:
a first bobbin defining:
   a first aperture; and
   a first winding receiving slot about an exterior of the first bobbin;
a second bobbin:
   arranged opposite the first bobbin;
   defining a second aperture in alignment with the first aperture; and
   defining a second winding receiving slot about an exterior of the second bobbin;
a stator pole:
   formed of a ferrous material;
   interposed between the first bobbin and the second bobbin;
   defining a third aperture in alignment with the first aperture and the second aperture to define a pole tunnel segment; and
   comprising the receiving member arranged at an outer radial side of the stator pole; and
a winding:
   coiled about the first winding receiving slot and the second winding receiving slot; and
   comprising a first set of leads coupled to the controller.

7. The system of claim 1:
wherein the rotor further comprises:
   an inner rotor core:
      arranged within an inner radius of the set of coil assemblies;
      defining a set of inner slots arranged about the inner rotor core; and
      comprising a subset of inner radial magnetic elements, in the set of magnetic elements, arranged at the set of inner slots and facing the inner radial facet of the set of coil assemblies; and
   an outer rotor core comprising;
      a first outer plate:
         coupled to the inner rotor core;
         defining a first set of outer slots; and
         comprising a first subset of axial magnetic elements, in the set of magnetic elements, arranged at the first set of outer slots and facing the first axial facet of the set of coil assemblies;
      a second outer plate:
         arranged opposite the first outer plate;
         defining a second set of outer slots; and
         comprising a second subset of axial magnetic elements, in the set of magnetic elements, arranged at the second set of outer slots and facing the second axial facet of the set of coil assemblies;
      an outer radial wall:
         interposed between the first outer plate and the second outer plate;
         defining a set of outer slots arranged about the outer radial wall; and
         comprising a subset of outer radial magnetic elements, in the set of magnetic elements, arranged at the set of outer slots and facing the outer radial facet of the set of coil assemblies; and
wherein the shaft is rigidly coupled to the inner rotor core.

8. The system of claim 1, wherein the set of magnetic elements comprises:
a set of inner radial magnetic elements:
   arranged in a first Halbach array configuration about the inner radial facet of the stator; and
   defining a first flux density distribution focused toward the inner radial facet;
a set of outer radial magnetic elements:
   arranged in a second Halbach array configuration, in alignment with the first Halbach array configuration, about the outer radial facet of the stator; and
   defining a second flux density distribution focused toward the outer radial facet;
a first set of axial magnetic elements:
   arranged in a third Halbach array configuration about the first axial facet of the stator; and
   defining a third flux density distribution focused toward the first axial facet; and
a second set of axial magnetic elements:
   arranged in a fourth Halbach array configuration, in alignment with the third Halbach array configuration, about the second axial facet of the stator;
   defining a fourth flux density distribution focused toward the second axial facet; and
   cooperating with the set of inner radial magnetic elements, the set of outer radial magnetic elements, and the first set of axial magnetic elements to form a magnetic flux tunnel enveloping the set of coil assemblies.

9. The system of claim 1:
wherein the stator further comprises:
a first yoke segment extending radially about the motor axis; and
a second yoke segment:
coupled at a first end and a second end of the first yoke segment;
extending radially about the motor axis; and
cooperating with the first yoke segment to define a cylindrical yoke of the stator; and
wherein the set of coil assemblies comprises:
a first subset of coil assemblies defining a first tunnel segment configured to receive the first yoke segment; and
a second subset of coil assemblies defining a second tunnel segment configured to receive the second yoke segment.

10. The system of claim 1, wherein the housing further comprises:
a base comprising a first set of intake vents;
a cover arranged opposite the base and comprising a second set of intake vents; and
a cylindrical body:
interposed between the base and the cover to define a cavity configured to locate the rotor and the stator within the housing; and
comprising a set of outtake vents radially arranged about the cylindrical body.

11. The system of claim 1, wherein the set of magnetic elements comprises:
a subset of inner radial magnetic elements arranged in a radial pattern about the inner radial facet of the set of coil assemblies;
a first subset of axial magnetic elements arranged in a radial pattern about the first axial facet of the set of coil assemblies;
a second subset of axial magnetic elements arranged in a radial pattern about the second axial facet of the set of coil assemblies; and
a first subset of outer radial magnetic elements:
arranged normal the first subset of axial magnetic elements; and
extending partially across the outer radial facet of the set of coil assemblies; and
a second subset of outer radial magnetic elements:
arranged normal the second subset of axial magnetic elements;
extending partially across the outer radial facet of the set of coil assemblies; and
cooperating with the first subset of outer radial magnetic elements to define a radial slot exposing the receiving member of each coil assembly, in the set of coil assemblies, arranged about outer radial facet.

12. The system of claim 1:
wherein the rotor further comprises:
a first radial plate:
encompassing the first axial facet of the set of coil assemblies; and
comprising a first subset of axial magnetic elements, in the set of magnetic elements, arranged in a radial pattern facing the first axial facet of the set of coil assemblies;
a first inner rotor core:
arranged within an inner radius of the set of coil assemblies;
extending a first length, less than a length of the inner radial facet of the set of coil assemblies;
centrally coupled to the first radial plate; and
comprising a first subset of inner radial magnetic elements, in the set of magnetic elements, arranged in a radial pattern facing the inner radial facet of the set of coil assemblies; and
a first outer radial wall:
extending about an outer radius of the first radial plate;
partially encompassing the outer radial facet of the set of coil assemblies; and
comprising a first subset of outer radial magnetic elements, in the set of magnetic elements, arranged in a radial pattern facing the first axial facet of the set of coil assemblies; and
wherein the shaft:
extends outwardly from the first radial plate coaxial with the motor axis; and
is rigidly coupled to the first inner rotor core.

13. The system of claim 12:
wherein the rotor further comprises:
a second radial plate:
arranged opposite the first radial plate;
encompassing the second axial facet of the set of coil assemblies; and
comprising a second subset of axial magnetic elements, in the set of magnetic elements, arranged in a radial pattern facing the second axial facet of the set of coil assemblies;
a second inner rotor core:
arranged opposite the first inner rotor core within the inner radius of the set of coil assemblies;
extending a second length, matching the first length of the first inner rotor core, and less than the length of the inner radial facet of the set of coil assemblies;
centrally coupled to the second radial plate; and
comprising a second subset of inner radial magnetic elements, in the set of magnetic elements, arranged in a radial pattern facing the inner radial facet of the set of coil assemblies; and
a second outer radial wall:
extending about an outer radius of the second radial plate;
partially encompassing the outer radial facet of the set of coil assemblies;
comprising a second subset of outer radial magnetic elements, in the set of magnetic elements, arranged in a radial pattern facing the second axial facet of the set of coil assemblies; and
cooperating with the first outer radial wall to define a radial slot exposing the receiving member of each coil assembly, in the set of coil assemblies, arranged about the outer radial facet; and
wherein the shaft is rigidly coupled to the second inner rotor core.

14. The system of claim 1, wherein the set of coil assemblies further comprises:
a first subset of coil assemblies defining a first phase winding for the electric motor and comprising:
a first set of bobbins arranged radially about the motor axis;
a first set of windings wound about the first set of bobbins;
a first set of stator poles interposed between the first set of bobbins; and a first set of leads coupled to the controller;
a second subset of coil assemblies defining a second phase winding, different from the first phase winding, of the electric motor and comprising:
   a second set of bobbins arranged radially about the motor axis adjacent the first set of bobbins;
   a second set of windings wound about the second set of bobbins;
   a second set of stator poles interposed between the second set of bobbins; and
   a second set of leads coupled to the controller; and
a third subset of coil assemblies:
   defining a third phase winding, different from the first phase winding and the second phase winding, of the electric motor;
   comprising:
      a third set of bobbins arranged radially about the motor axis adjacent the first set of bobbins and the second set of bobbins;
      a third set of windings wound about the third set of bobbins;
      a third set of stator poles interposed between the third set of bobbins; and
      a third set of leads coupled to the controller; and
   cooperating with the first subset of coil assemblies, the second subset of coil assemblies, and the third subset of coil assemblies to define a 3-phase configuration for the electric motor.

15. A system for an electric motor comprising:
a set of coil assemblies:
   radially arranged about a motor axis;
   defining an inner radial facet, an outer radial facet, a first axial facet, and a second axial facet opposite the first axial facet; and
   each coil assembly in the set of coil assemblies comprising a receiving member arranged at the outer radial facet of the coil assembly;
a set of magnetic elements:
   encompassing the inner radial facet, the outer radial facet, the first axial facet, and the second axial facet of the set of coil assemblies;
   defining a radial magnetic tunnel about the motor axis; and
   configured to generate a flux density distribution focused toward the set of coil assemblies; and
a housing:
   containing the set of coil assemblies and the set of magnetic elements;
   comprising a set of fastening members engaging the receiving member of each coil assembly, in the set of coil assemblies to:
      couple the housing to the set of coil assemblies; and
      define an interstice between an inner radial wall of the housing and a subset of outer radial magnetic elements, in the set of magnetic elements, encompassing the outer radial facet of the set of coil assemblies; and
   comprising a shaft coaxial with the motor axis and coupled to the set of magnetic elements.

16. The system of claim 15, wherein the receiving member of each coil assembly, in the set of coil assemblies, protrudes outwardly from the outer radial facet and defines a threaded cavity.

17. The system of claim 16:
wherein the housing further comprises a set of apertures:
   radially arranged about a cylindrical body of the housing; and
   aligned with the receiving member of each coil assembly, in the set of coil assemblies; and
wherein the set of fastening members:
   is received through the set of apertures at the cylindrical body; and
   engages the threaded cavity of the receiving member of each coil assembly in the set of coil assemblies to:
      rigidly couple the housing to the stator; and
      define the interstice between an inner radial wall of the housing and the subset of outer radial magnetic elements, in the set of magnetic elements, encompassing the outer radial facet of the set of coil assemblies.

18. The system of claim 15, wherein the set of magnetic elements comprises:
   a set of inner radial magnetic elements arranged in a radial pattern about the inner radial facet of the set of coil assemblies and defining a first flux density distribution focused toward the inner radial facet;
   the set of outer radial magnetic elements arranged in a radial pattern about the outer radial facet of the set of coil assemblies and defining a second flux density distribution focused toward the outer radial facet;
   a first set of axial magnetic elements arranged in a radial pattern about the first axial facet of the set of coil assemblies and defining a third flux density distribution focused toward the first axial facet; and
   a second set of axial magnetic elements:
      arranged in a radial pattern about the second axial facet of the set of coil assemblies;
      defining a fourth flux density distribution focused toward the second axial facet; and
      cooperating with the set of inner radial magnetic elements, the set of outer radial magnetic elements, and the first set of axial magnetic elements to form a magnetic flux tunnel enveloping the set of coil assemblies.

19. The system of claim 15, further comprising a controller configured to drive current through the set of coil assemblies to generate a toroidal magnetic field tunnel configured to sequentially and magnetically couple the set of magnetic elements contained within the housing.

20. A system for an electric motor comprising:
a set of coil assemblies:
   radially arranged about a motor axis;
   defining an inner radial facet, an outer radial facet, a first axial facet, and a second axial facet opposite the first axial facet; and
   each coil assembly in the set of coil assemblies comprising a receiving member arranged at the outer radial facet of the coil assembly;
a set of magnetic elements:
   encompassing the inner radial facet, the outer radial facet, the first axial facet, and the second axial facet of the set of coil assemblies; and
   defining:
      a radial magnetic tunnel about the motor axis; and
      a radial slot exposing the receiving member of each coil assembly, in the set of coil assemblies, arranged about the outer radial facet of the set of coil assemblies;
a housing containing the set of coil assemblies and the set of magnetic elements, and comprising a coupling ring:
   interposed between the outer radial facet of the set of magnetic elements;
   coupled to the receiving member of each coil assembly, in the set of coil assemblies; and defining an interstice between an inner radial wall of the housing and a subset of outer radial magnetic elements, in the set of magnetic elements, encompassing the outer radial facet of the set of coil assemblies; and a shaft coaxial with the motor axis and coupled to the set of magnetic elements.

\* \* \* \* \*